United States Patent

Kato et al.

[11] Patent Number: 5,782,086
[45] Date of Patent: Jul. 21, 1998

[54] FAILURE DETECTION SYSTEM OF EXHAUST SECONDARY AIR SUPPLY SYSTEM OF INTERNAL COMBUSTION ENGINE

[75] Inventors: Hiroaki Kato; Yuichi Shimasaki; Takashi Komatsuda; Akihisa Saito; Tetsu Teshirogi; Takuya Aoki; Hideo Furumoto; Hiroaki Muramatsu, all of Wako; Takayoshi Nakayama, Haga-machi, all of Japan

[73] Assignee: Honda Giken Kogyo Kabushiki Kaiha, Tokyo, Japan

[21] Appl. No.: 674,691

[22] Filed: Jul. 2, 1996

[30] Foreign Application Priority Data

Jul. 4, 1995 [JP] Japan .................. 7-191242

[51] Int. Cl.⁶ .................. F01N 3/20; F01N 3/22; F01N 3/30
[52] U.S. Cl. .................. 60/274; 60/276; 60/277; 60/289
[58] Field of Search .................. 60/274, 277, 285, 60/289, 300, 276

[56] References Cited

U.S. PATENT DOCUMENTS

| | | | |
|---|---|---|---|
| 5,381,658 | 1/1995 | Meguro | 60/277 |
| 5,388,401 | 2/1995 | Nishizawa et al. | 60/277 |
| 5,400,591 | 3/1995 | Aramaki | 60/277 |
| 5,526,642 | 6/1996 | Dambach et al. | 60/277 |
| 5,560,199 | 10/1996 | Agustin et al. | 60/277 |
| 5,615,552 | 4/1997 | Shimasaki et al. | 60/277 |

FOREIGN PATENT DOCUMENTS

| | | |
|---|---|---|
| 1-232246 | 9/1989 | Japan . |
| 2-24550 | 1/1990 | Japan . |
| 6-42342 | 2/1994 | Japan . |

*Primary Examiner*—Willis R. Wolfe
*Attorney, Agent, or Firm*—Nikaido, Marmelstein, Murray & Oram LLP

[57] ABSTRACT

A system and method for detecting a failure occurring in an exhaust secondary air supply system of an internal combustion engine. A conduit is connected to the exhaust pipe to supply secondary air to the exhaust pipe to promote oxidization of the emissions in the exhaust gases. A valve is provided in the conduit for opening/closing it. The failure of the valve is detected by operating the air pump to supply the air in the conduit, while closing the conduit by the valve. The air/fuel ratio is detected by an oxygen sensor installed downstream of the conduit to be compared with a desired air/fuel ratio. If the detected air/fuel ratio is leaner than a desired air/fuel ratio, the air flows to the exhaust pipe so that the valve is considered to be stuck to open. Alternatively, a pump current is detected and is compared with a reference value indicative of the current at no air flow. If the detected current is less than the reference value, the valve is considered to be in failure. Moreover, the movement of a valve member is sensed to detect whether the valve is stuck to close.

21 Claims, 8 Drawing Sheets

5,782,086

1

FAILURE DETECTION SYSTEM OF EXHAUST SECONDARY AIR SUPPLY SYSTEM OF INTERNAL COMBUSTION ENGINE

FIELD OF THE INVENTION

This invention relates to a system and a method for detecting a failure or trouble occurring in an exhaust secondary air supply system of an internal combustion engine, and more particularly to a system and a method for detecting a failure or trouble occurring in an open/close valve which regulates the secondary air to be supplied to the engine exhaust system.

DESCRIPTION OF THE RELATED ART

An internal combustion engine usually has a three-way catalytic converter in the exhaust system which reduces all three types of CO, HC, and NOx emissions that escape through the exhaust system, and which removes pollutants from the exhaust gases in the engine exhaust system. However, the catalyst is ineffective or inactive until its temperature has risen to a high temperature. It takes a long time until the catalytic converter has heated up to the necessary temperature from, for example, cold engine starting. For that reason, a catalytic converter having an electric heater that heats the catalyst to promote the activation is nowadays used.

The electrically heated catalytic converter has an electric heater that, when supplied with current, burns off the unburned exhaust gases generated by the engine and passing through the engine exhaust to promote the activation of the catalytic converter itself and other ordinary catalytic converter(s) installed downstream thereof. The electrically heated catalytic converter is often paired with an air pump which forcibly supplies air to the engine exhaust to encourage HC, CO emissions to oxidize, thereby enhancing exhaust gas purification efficiency.

More particularly, the exhaust secondary air supply system has such an air pump which is installed at a far end of an air supply conduit connected to the exhaust pipe at a position upstream of the location where the electrically heated catalytic converter is placed, and an open/close valve located in the air supply conduit for regulating air flow. Japanese Laid-Open Patent Application No. 6(1994)-42,342 teaches this type of exhaust secondary air supply system.

Since a failure or trouble occurring in the open/close valve in the exhaust secondary air supply system degrades the exhaust gas purification efficiency, it is necessary to detect if a failure has occurring in the valve. Conventionally, the current and voltage supplied to the air pump motor were monitored to detect whether a failure or trouble has occurred in the air pump. Disadvantageously, the conventional method was unable to detect a failure or trouble occurring in the open/close valve in the exhaust secondary air supply system.

An object of the invention is therefore to solve the drawback of the prior art and to provide a system and a method for detecting or trouble of an exhaust secondary air supply system, more specifically to provide a system and a method for detecting a failure or trouble occurring in the open/close valve of the exhaust secondary air supply system of an internal combustion engine.

SUMMARY OF THE INVENTION

In order to achieve the object, the present invention provides a system for detecting a failure occurring in an

2 exhaust secondary air supply system of an internal combustion engine, comprising a catalytic converter installed in an exhaust pipe of an exhaust system of the engine for reducing pollutants from exhaust gases emitted from the engine, a conduit connected, at one end, to the exhaust pipe at a location upstream of the catalytic converter, an air pump connected to an opposite end of the conduit for supplying air in the conduit, air pump operation control means for controlling operation of the air pump, a valve provided in the conduit, valve operation control means for controlling operation of the valve to open/close the conduit, air flow determining means for determining whether the air flows in the conduit, and valve failure detecting means for detecting a failure occurring in the valve based on the determined air flow in the conduit when the air pump is controlled to operate while the valve is controlled to close the conduit.

BRIEF DESCRIPTION OF THE DRAWINGS

The above and other objects and advantages of the invention will be more apparent from the following description and drawings, in which.

DESCRIPTION OF THE PREFERRED EMBODIMENTS

Embodiments of the invention, given by way of example only, will now be explained with reference to the drawings.

Figure 1:
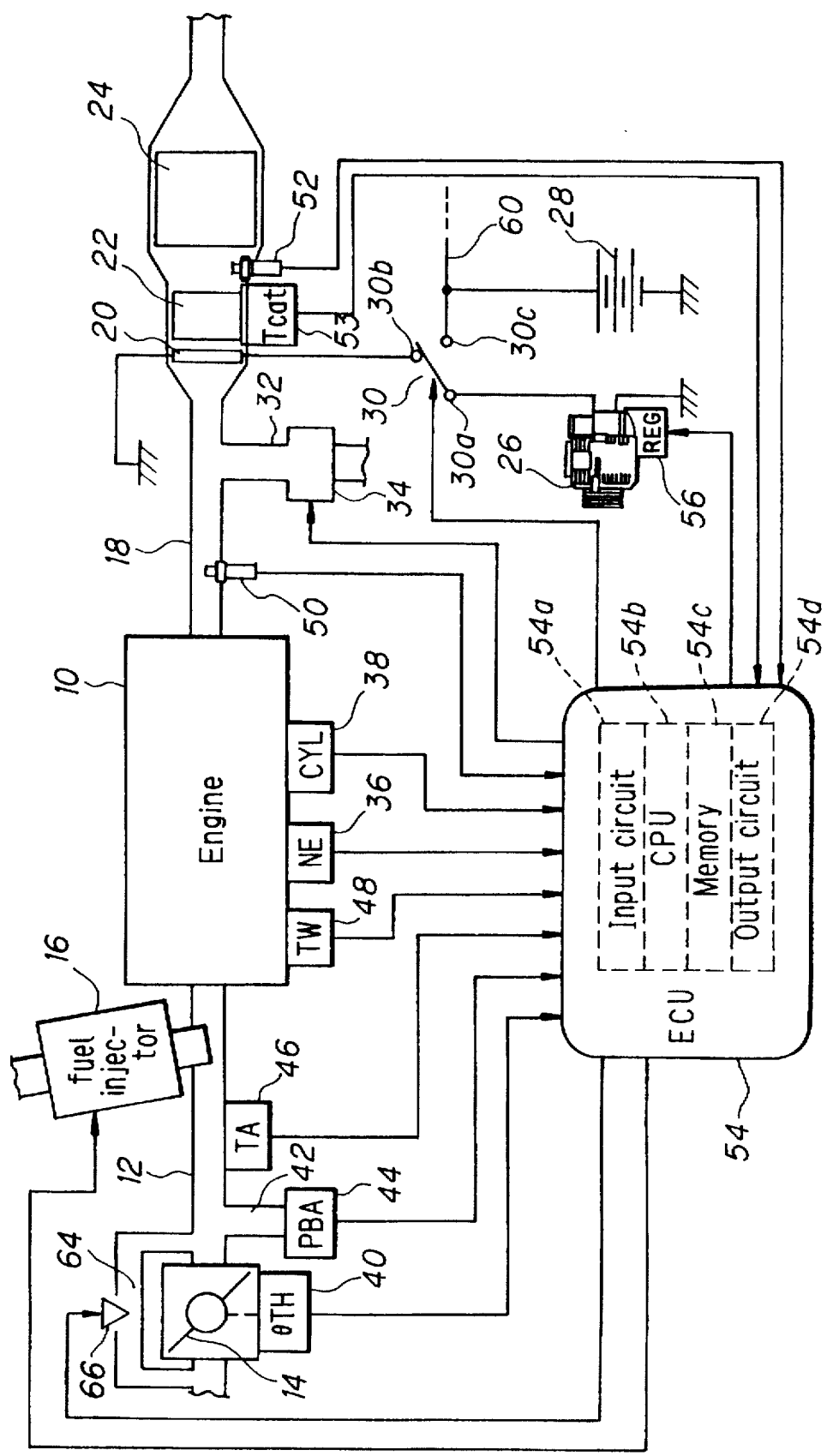
FIG. 1 is an overall schematic view showing a system for detecting a failure or trouble of an exhaust secondary air supply system of an internal combustion engine according to the invention.

FIG. 1 is an overall schematic view showing a system for detecting a failure or trouble of an exhaust secondary air supply system of an internal combustion engine according to the invention.

Reference numeral 10 in this figure designates a multi-cylinder engine such as a four-cylinder internal combustion engine. Air drawn into an air intake pipe 12 through an air cleaner (not shown) mounted on a far end thereof is supplied to each of the first to fourth cylinders through a surge tank and an intake manifold (neither shown), while the flow thereof is adjusted by a throttle valve 14 provided in the air intake pipe 12. A fuel injector 16 for injecting fuel is installed in the vicinity of intake valves (not shown) of each cylinder of the engine. The injected fuel mixes with the intake air to form an air-fuel mixture that is ignited in the associated cylinder by a spark plug (not shown). The resulting combustion of the air-fuel mixture drives a piston (not shown) down.

The exhaust gas produced by the combustion is discharged through exhaust valves and an exhaust manifold (neither shown) to an exhaust pipe 18. The exhaust pipe 18 is installed with, in order from the upstream side, the aforesaid electrically heated catalytic converter (hereinafter referred to as "EHC") 20 having a heater (not expressly shown), a start catalytic converter 22 and a three-way catalytic converter 24, which burn off the remaining HC, CO, and NOx emissions in the exhaust gases which escape from the cylinders thus reducing pollutants in the exhaust gases from the engine exhaust system. The start catalytic converter 22 (known as a "light-off catalyst") is configured to have a relatively small diameter and volume and is provided in particular for enhancing catalyst conversion efficiency immediately after engine starting.

The body of the EHC 20, i.e., a carrier that carries the catalyst is made of a metal mesh. The metal mesh is manufactured by extruding metallic materials, then by sintering them to a ceramic bar, and then by cutting the bar into disc-shaped slices of 10 cm thickness. The metal mesh is provided with slits form a current supply path therebetween. Thus, the metal mesh itself is configured to be an electric heater. The current path has an anode and a cathode at its opposite ends thereof.

As illustrated in the figure, an alternator 26 is provided in the vicinity of the engine 10. The alternator 26 is connected to the crankshaft (not shown) of the engine 10 and is driven to produce electric energy. The generated electric energy is supplied to the EHC 20 or a battery 28. More specifically, a switch 30 is inserted in the current supply circuit. When terminals 30a and 30b are connected, the anode of the metal mesh (heater) of the EHC 20 is connected with the alternator 26 to be supplied with current for heating up. As a result, the heated EHC 20 burns off the remaining emissions generated immediately after the engine starting. The EHC 20 further heats up with the heat generated by the chemical reaction of the burning and promptly reaches the activation temperature, thereby promoting the start catalytic converter 22 and the three-way catalytic converter 24 installed downstream thereof to activate.

The exhaust pipe 18 is connected with a conduit 32 which has an air pump 34 at the opposite end for supplying secondary air. Since a large amount of unburned gases are produced at engine starting, the air pump 34 is installed to supply air to the exhaust pipe 18 to promote burning, thereby enhancing conversion efficiency of the catalysts.

A crankshaft position sensor 36, illustrated as "NE" in the figure, is provided on the camshaft or crankshaft (neither shown) which produces a signal once per predetermined crank angular position. A camshaft position sensor 38, illustrated as "CYL" in the figure, is similarly provided on the camshaft (not shown) which produces a signal at a prescribed crank angular position of the first cylinder. A throttle position sensor 40, illustrated as "θTH" in the figure, is connected to the throttle valve 14 to detect, and to generate a signal indicative of, the degree of opening of the throttle valve 14. The air intake pipe 12 is branched off downstream of the position where the throttle valve 14 is placed, to have a branch 42. A manifold absolute pressure sensor 44, illustrated as "PBA" in the figure, is installed at the far end of the branch 42, to detect, and to generate a signal indicative of, the intake manifold pressure downstream of the throttle valve 14 in terms of absolute pressure.

In addition, the air intake pipe 12 is provided with an intake air temperature sensor 46, illustrated as "TA" in the figure, for detecting, and for generating a signal indicative of, the temperature of the intake air; and an engine coolant temperature sensor 48, illustrated as "TW" in the figure, for detecting, and for generating a signal indicative of, the temperature of the engine coolant is provided at a suitable location of the engine 10.

On the other hand, the exhaust pipe 18 is provided with, upstream of the intersection where the conduit 32 is connected, a first oxygen sensor 50 comprising an $O_2$ sensor for detecting, and for generating a signal indicative of, the oxygen content in the exhaust gases. The exhaust pipe 18 is further provided with a second oxygen sensor 52 similarly comprising an $O_2$ sensor, at a position between the start catalytic converter 22 and the three-way catalytic converter 24. A temperature sensor 53, illustrated as "Tcat" in the figure, is provided in the proximity of the second $O_2$ sensor 52 to detect, and for generating a signal indicative of, the exhaust system ambient temperature.

The first and second $O_2$ sensors are respectively provided with a heater which heats up the detection element comprised of a special ceramic core, upon receipt of current from current supply circuits (neither shown). Since the structure and configuration of the $O_2$ sensors of this kind are known from prior art references such as Japanese Laid-Open Patent Application Nos. Hei 1(1989)-232,246 and Hei 2(1990)-24, 550, no further explanation thereof will be made.

The signals outputted from the sensors are sent to a control unit 54 that is illustrated as "ECU" in the figure.

The ECU 54 comprises a microcomputer made up of an input circuit 54a, a CPU 54b, a memory 54c and an output circuit 54d. The input circuit 54a carries out various procedures including shaping some sensor signal waveforms, converting some sensor signals to predetermined levels in voltage, and converting some analog sensor signals into digital values. The memory 54c stores various data including calculation programs and the results of the calculations in response to the instructions made by the CPU 54b.

The CPU 54b operates, via the switch 30, to connect the alternator 26 to the EHC 20 to supply current thereto in response to the detected parameters. The alternator 26 has a regulator 56. The CPU 54b determines and outputs a pulse train indicative of a duty cycle in a pulse-width modulation control such that the alternator 26 produces electric power at a level determined by the duty cycle.

In the switch 30, on the other hand, when the terminal 30a is switched to connect with the terminal 30c, the alternator 26 is connected with the battery 28 to charge it. The battery 28 is connected, through a line 60, to various electric loads including a motor (not shown) of the air pump 34. The CPU 54b controls the operation of the air pump 34 by controlling the operation of the motor, and controls fuel metering through the fuel injector 16.

Figure 2:
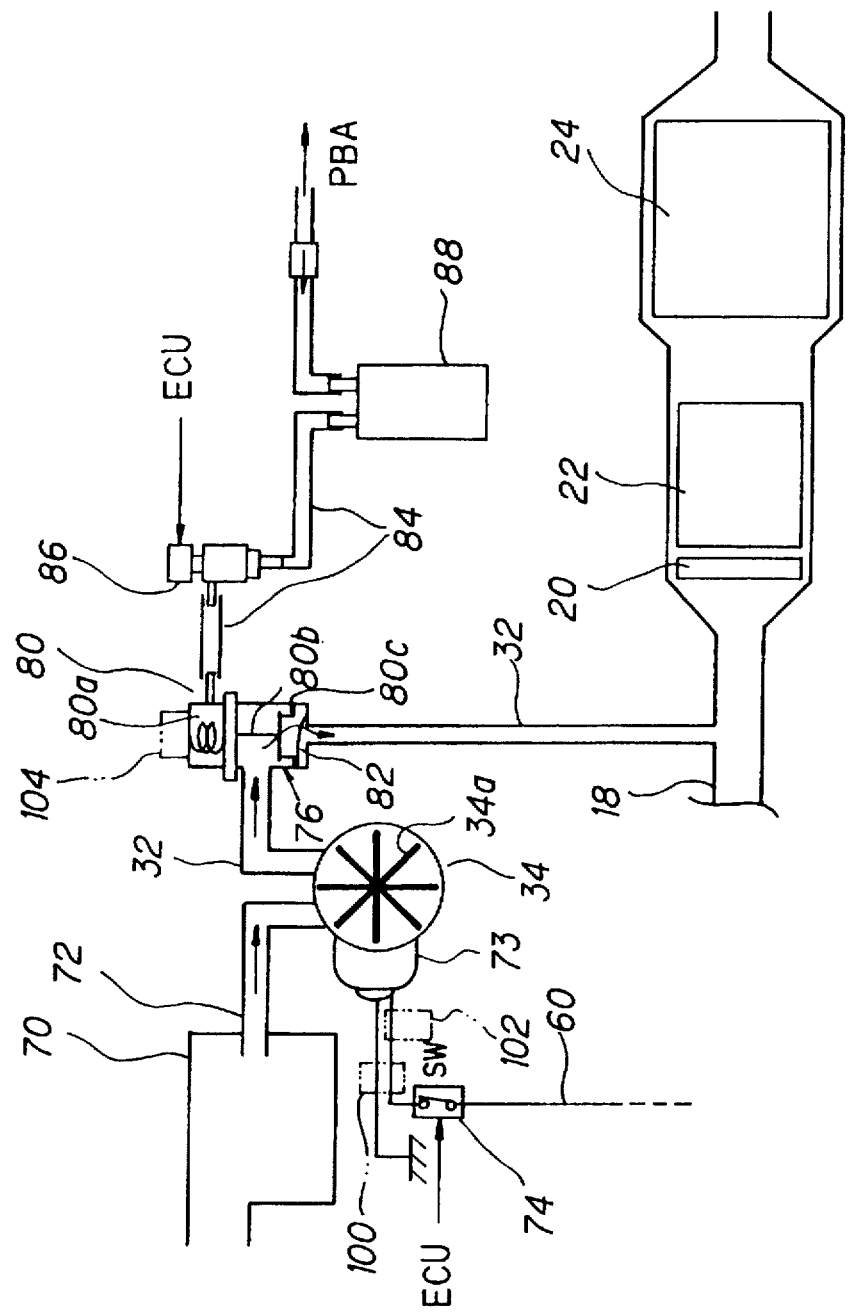
FIG. 2 is a view showing the exhaust secondary air supply system in detail illustrated in FIG. 1.

FIG. 2 is an explanatory view showing the exhaust secondary air supply system in detail.

As referred to earlier, the conduit 32 through which the air compressed by the air pump 34 flows, is connected to the exhaust pipe 18 at a location upstream (in terms of exhaust gas flow) of the EHC 20, etc. The air pump 34 is in turn connected with an air cleaner 70 via a second conduit 72 such that it draws fresh air filtered by the air cleaner 70 through the conduit 72 to forcibly supply the compressed air to the exhaust pipe 18 through the air supply conduit 32. The driver circuit of an electric motor 73 of the air pump 34 is connected to the aforesaid power supply line 60 via a switch 74. The ECU 54 controls the operation of the air pump motor 73 by opening/closing the switch 74.

The air supply conduit 32 is provided with the aforesaid open/close valve (hereinafter referred to as a "cut valve") 76.

The cut valve 76 comprises an air switching valve 80 and a reed valve 82. The air switching valve 80 has a diaphragm (not shown) to form a chamber 80a that is connected with the air intake pipe 12, as illustrated in FIG. 1, via a passage 84, at a location downstream of the throttle valve 14. The passage 84 is equipped with a solenoid valve (electromagnetic valve) 86 which is driven by the ECU 54 and when energized (turned to ON), it opens the passage 84. When the passage 84 is opened, the manifold pressure PBA (negative pressure) is drawn to the chamber via a vacuum tank 88 to pull a valve member 80b rested on a valve seat 80c therefrom in the direction upward in the figure.

The reed valve 82 is made of an elastic plate whose end is cantilevered back at the edge of the valve seat 80c in such a manner that the opposite free end closes the central hole of the valve seat 80c. As a result, when the air switching valve member 80b is pulled upward as mentioned above, the air forcibly supplied by the air pump 34 flows through a gap generated between the valve member 80b and the valve seat 80c to exert a pushing force on the reed valve 82. The reed valve 82 is accordingly pushed down and when the pushing force has reached a predetermined level, the reed valve free end bends away from the back of the valve seat 80b. Consequently, the air passes through the valve seat central hole in the direction shown by the arrow in the figure, flows through the exhaust pipe 18, and reaches the EHC 20, etc., to promote the oxidization of the emissions in the exhaust gases.

The plate forming the reed valve 82 is configured to have a plane area which is greater than the central hole of the valve seat 80c. Thus, the reed valve 82 operates as a kind of check valve to prevent the exhaust gases from flowing reversely through the air supply conduit 32 towards the air pump 34.

In the air intake side in the figure, the air intake pipe 12 is provided with a secondary air intake pipe 64 which bypasses the location where the throttle valve 14 is placed. An electromagnetic valve 66 is provided to open/close the secondary air intake pipe 12. The CPU 54b controls the engine speed to a desired idle speed by regulating the amount of air passing through the secondary air intake pipe 64 by generating and supplying pulse trains of the pulse-width modulation to a driver circuit of the electromagnetic valve 66 that determines the amount of lifting or stroke of the valve 66.

Figure 3:
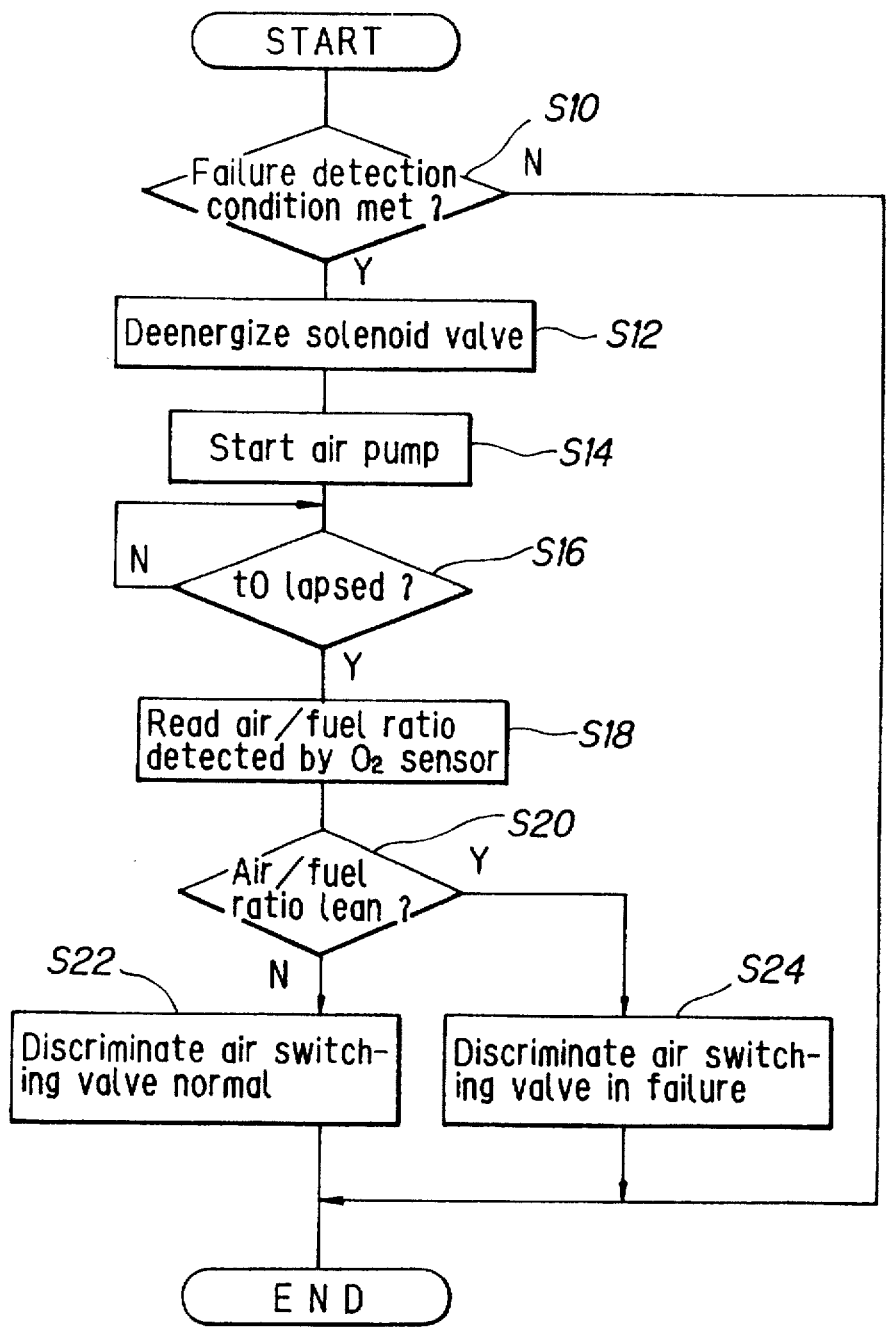
FIG. 3 is a flowchart showing the operation of the system illustrated in FIG. 1.
Figure 4:
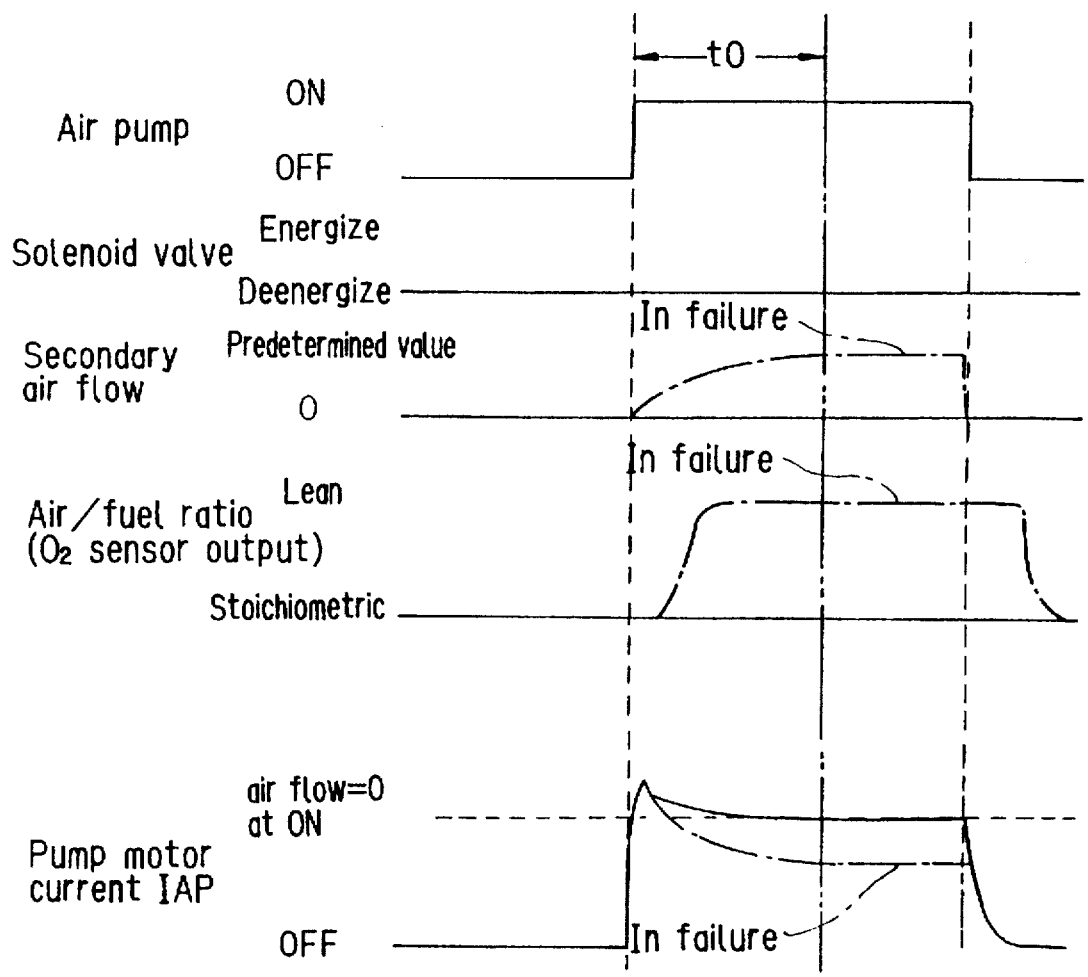
FIG. 4 is a timing chart showing the operation of the system illustrated in FIG. 3.

FIG. 3 is a flowchart showing the operation of the system according to the invention and FIG. 4 is a timing chart explaining the operation.

Explaining this with reference to the flowchart of FIG. 3, the program starts at S10 in which it is checked whether a condition for failure detection is met. The condition is met when the battery voltage (monitored by a sensor not shown) is within a predetermined range, and when the engine is under such a stable operation (e.g. in idling after having warmed up) as is feasible for failure detection. As stated earlier, the air pump is operated to work simultaneously with the current supply control to the heater of the EHC 20. The failure detection in the embodiment is carried out, upon the air pump operation being completed.

When it is found in S10 that the condition is not met, the program is immediately terminated. On the other hand, when the decision in S10 is affirmative, the program proceeds to S12 in which the solenoid valve 86 is deenergized (turned to OFF) to close the passage 84, and to S14 in which the switch 74 is made ON to re-start the air pump 34 (illustrated as "ON" in FIG. 4). The program then goes to S16 in which it is checked whether a predetermined time or period t0 (e.g., 1 or 2 sec.) has passed since the restarting of the air pump. This is to wait until the operation of the air pump has become stable.

When the result in S16 is affirmative, the program moves to S18 in which the air/fuel ratio detected by the $O_2$ sensor 52 is read. The $O_2$ sensor 52 is the one of the two that is placed downstream of the junction where the air supply conduit 32 is connected to the exhaust pipe 18, in other words, the sensor that is located downstream of the cut valve 76 (more precisely the air switching valve 80).

The program then advances to S20 in which it is checked whether the detected air/fuel ratio is leaner than a desired air/fuel ratio, e.g., the stoichiometric air/fuel ratio and if it is not, the program goes to S22 in which the air switching valve 80 is discriminated or detected to be normal. On the other hand, when the result in S20 is YES, the program goes to S24 in which the air switching valve 80 (or the air switching valve 80 and the reed valve 82) is discriminated or detected to be in failure or trouble. It should be noted that when the fuel metering is controlled to a desired air/fuel ratio, it suffices if the detected air/fuel ratio is compared with the desired air/fuel ratio.

This will be explained with reference to FIG. 4. Since the solenoid valve 86 was made OFF, the air switching valve 80 in the cut valve 76 is closed so that the air does not act on the reed valve 82. However, if the air switching valve 80 is stuck to open for any reason, the air flows to the exhaust pipe 18 to increase the fresh air, rendering the air/fuel ratio lean. As a result, based on the output of the $O_2$ sensor 52 placed downstream (in terms of exhaust gas flow) of the air switching valve 80, it is possible to detect the exhaust secondary air flow, more precisely to detect whether or not the exhaust secondary air flows. Based on the result, it is thus possible to detect the if air switching valve is stuck or clogged in an opening state.

Having been configured in the foregoing manner, the system in the embodiment is able to easily detect a failure or trouble occurring in the open/close valve (cut valve 76) in the exhaust secondary air supply system, more specifically to easily detect that the air switching valve 80 (or both of the valve 80 and the reed valve 82) is/are stuck to open. Moreover, since the detection is made by utilizing the output of the $O_2$ sensor, the configuration of the system is quite simple.

Figure 5:
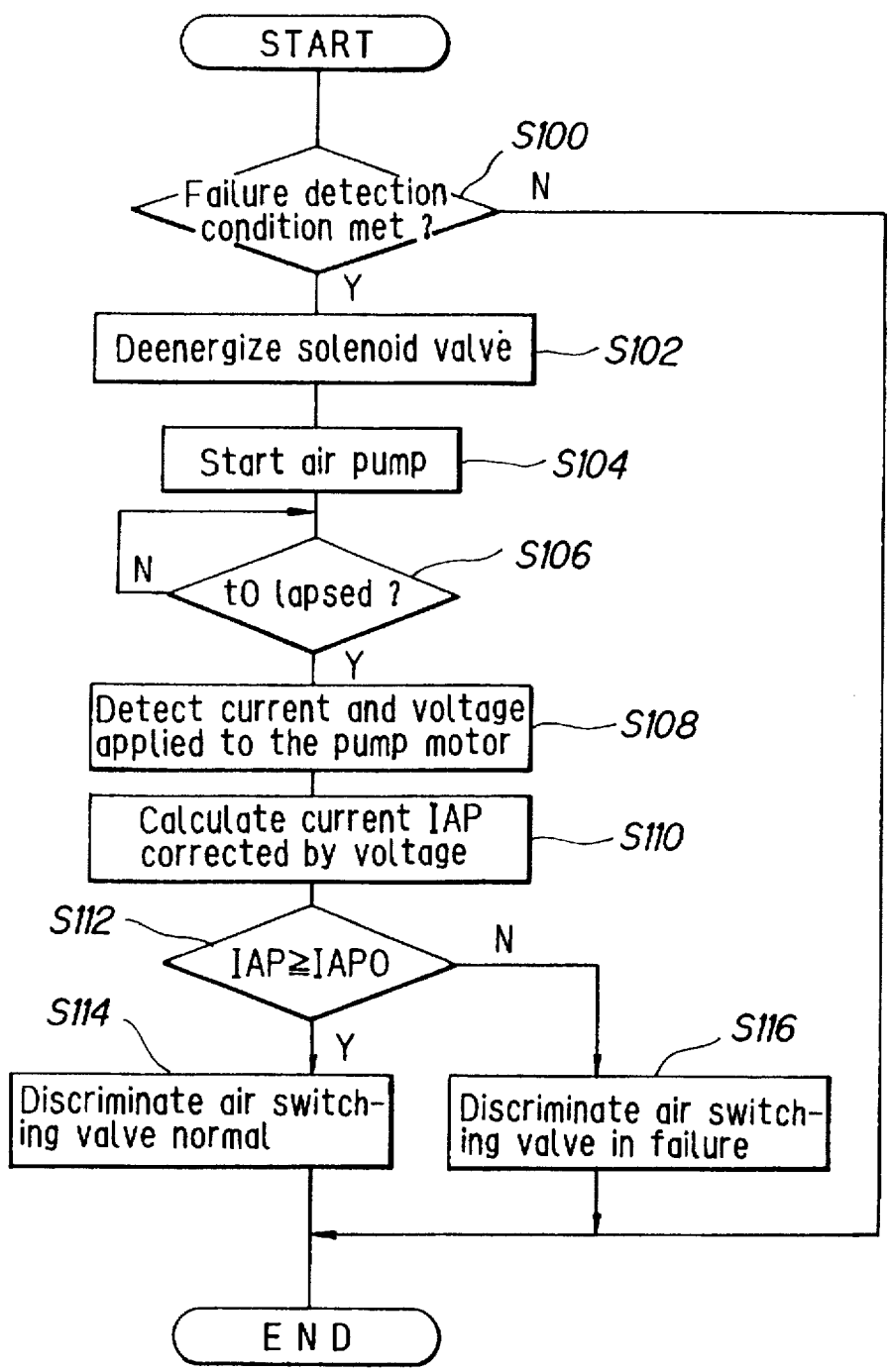
FIG. 5 is a flowchart, similar to FIG. 3, but showing the operation of the system according to a second embodiment of the invention.

FIG. 5 is a view, similar to FIG. 3, but showing the operation of the system according to a second embodiment of the invention.

In the second embodiment, the system is configured to have a voltmeter 100 and a current meter 102 in the current supply circuit of the air pump motor 73, as illustrated by phantom lines in FIG. 2.

Explaining the operation focusing on the differences from the first embodiment, the program begins at S100 and goes up to S106. Upon confirmation of the elapse of the aforesaid time t0 in S106, the program proceeds to S108 in which the voltage and current applied to the air pump motor 73 are detected through the sensors 100, 102. The program then moves to S110 in which the current IAP passing through the pump motor 73 is calculated by correcting the sensed current by the sensed voltage.

The program then proceeds to S112 in which it is checked whether the calculated current IAP is equal to or greater than a reference value IAPO. The reference value IAPO is a value which is obtained through experimentation beforehand to indicate a current value when the air flow is zero. When it is found in S112 that IAP≧IAPO, the program moves to S114 in which the air switching valve 80 is normal, as illustrated in the bottom of FIG. 4. On the contrary, when S112 finds that IAP<IAPO, the program goes to S116 in which the air switching valve 80 (or both the valves 80 and 82) is/are in failure or trouble.

Figure 6:
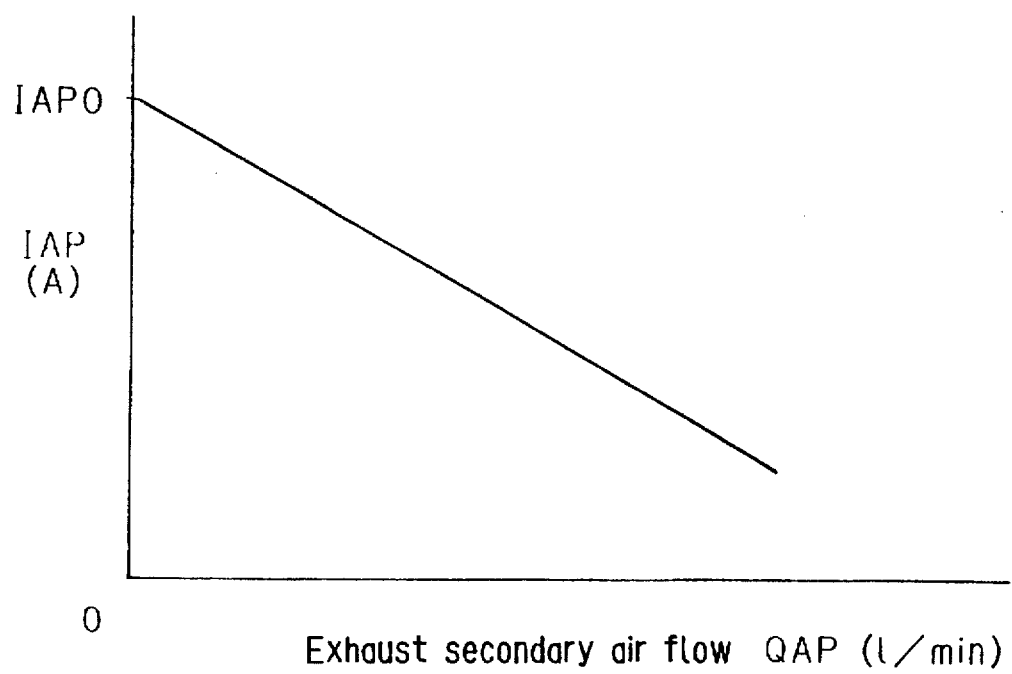
FIG. 6 is a graph showing the characteristics of the air pump motor current with respect to the exhaust secondary air flow referred to in the flowchart of FIG. 5.

FIG. 6 is a graph showing the characteristics of air pump motor current IAP with respect to the exhaust secondary air flow QAP. Explaining the above with reference to FIG. 6, the pump motor current IAP is inversely proportionate to the air flow due to the characteristics inherent to every motor. This is because since the air flow is proportionate to the motor speed, the pump current is inversely proportionate to the air flow. As illustrated, the motor current becomes its maximum value IAPO when the air flow is zero.

Accordingly, if the calculated current IAP is less than the reference value IAPO, the exhaust secondary air is flowing. Based on the result, it therefore becomes possible to discriminate whether a failure or trouble has occurred in the exhaust secondary air supply system, particularly in the open/close valve in the system, more specifically to detect whether the air switching valve 80 (or valves 80 and 82) is/are stuck to an opening state.

Figure 7:
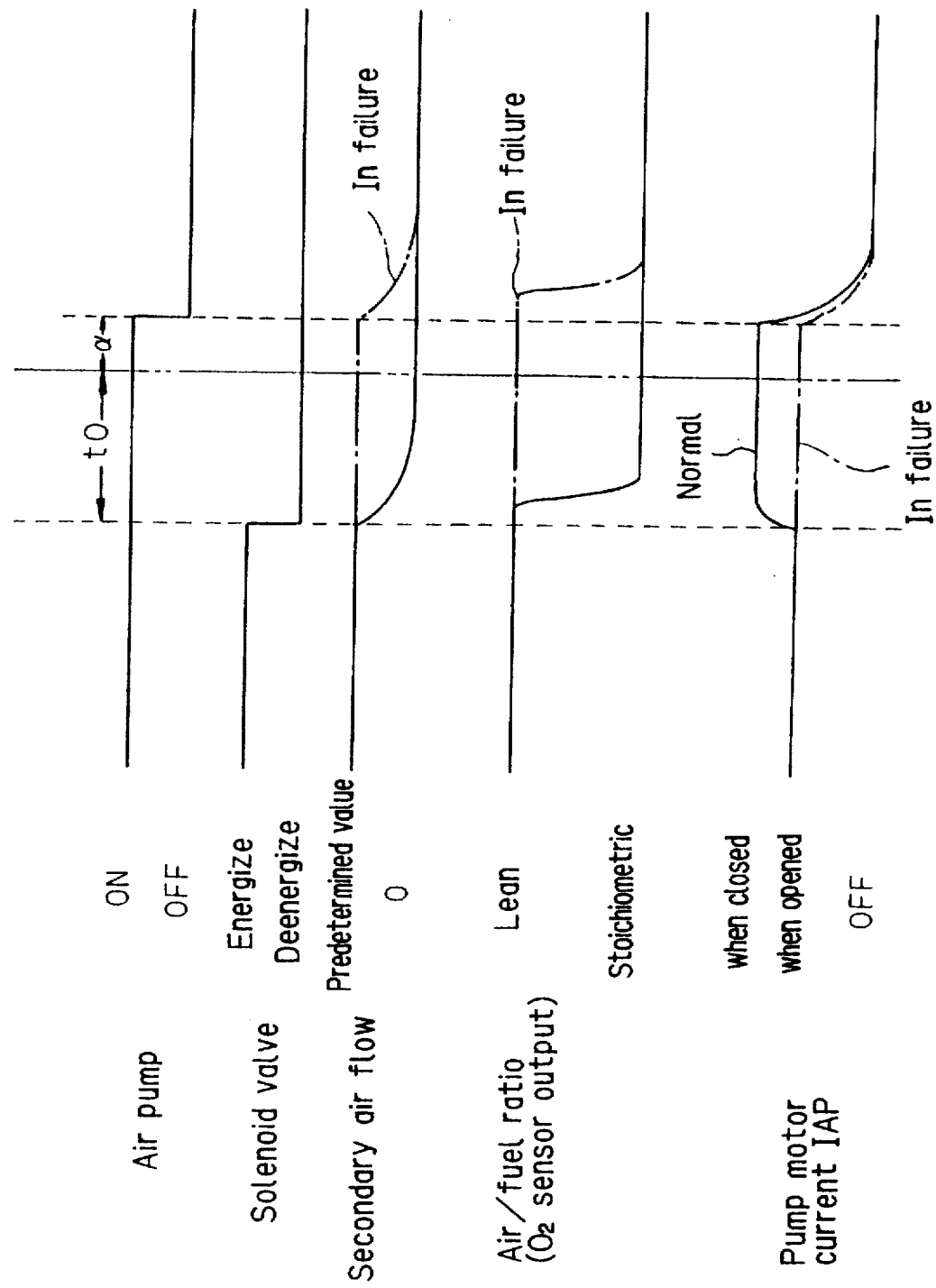
FIG. 7 is a timing chart, similar to FIG. 4, but showing the operation of the system according to a third embodiment of the invention.

FIG. 7 is a timing chart, similar to FIG. 4, but showing the operation of the system according to a third embodiment of the invention.

In the third embodiment, the system is configured such that, after deenergizing the solenoid valve 86 upon completion of the usual operation of the air pump, the stopping of the air pump is delayed until the aforesaid time t0+alpha has passed. After expiration of the time t0+alpha, the air/fuel ratio detected by the $O_2$ sensor 52 is read, or the pump motor current IAP is calculated. As illustrated in the figure, the failure detection is carried out on the basis of either of the results. The rest of the configuration as well as the effect or advantage thereof is the same as in the foregoing embodiments.

Figure 8:
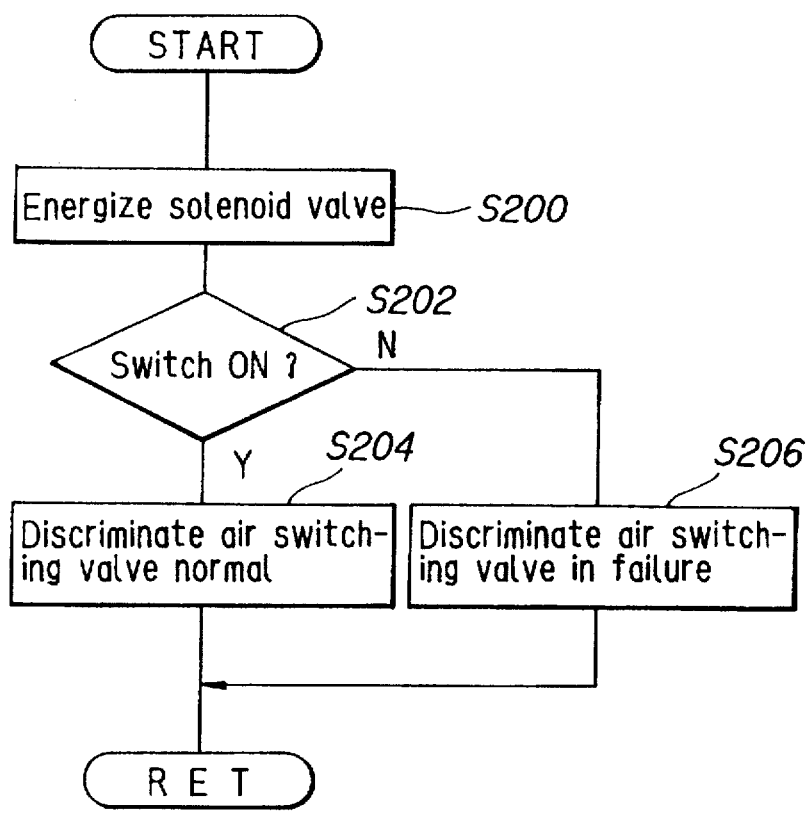
FIG. 8 is a flowchart, similar to FIG. 3, but showing the operation of the system according to a fourth embodiment of the invention.

FIG. 8 is a flowchart, similar to FIG. 3, but showing the operation of the system according to a fourth embodiment of the invention.

The system in the fourth embodiment is configured to have a switch or detector 104 mounted on the air switching valve 80, as illustrated by phantom lines in FIG. 2. The switch is turned ON when the valve member 80b travels to the stroke end.

Explaining the operation of the system according to the fourth embodiment with reference to FIG. 8, the program begins at S200 in which the solenoid valve 86 is energized (turned ON), and proceeds to S202 in which it is checked whether the switch 104 mounted on the air switching valve 80 is turned ON. If the result is affirmative, the program goes to S204 in which the air switching valve 80 is discriminated to be normal, but if the result in S202 is negative, since this means that the valve member 80a has not moved to the stroke end, i.e., the valve member 80b is considered to be stuck or clogged in a closing state, the program goes to S206 in which the air switching valve 80 is discriminated or detected to be in failure or trouble.

The system in the fourth embodiment can thus detect a failure or trouble occurring in the open/close valve, i.e., the air switching valve of the exhaust secondary air supply system, easily and accurately, using a simple switch (switch 104).

It should be noted in the fourth embodiment that the switch 104 is configured to be ON when the valve member 80a travels by a predetermined stroke before the stroke end.

It should also be noted in the foregoing embodiments that, although the failure detection of the air switching valve is carried out by detecting the air/fuel ratio (the $O_2$ sensor output) or the pump motor current, it is alternatively possible to provide an air flow meter downstream of the air switching valve to determine whether the exhaust secondary air is flowing and based on the result, to detect a failure or trouble occurring in the valve.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for detecting a failure occurring in an exhaust secondary air supply system of an internal combustion engine, comprising:

a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit;

air pump operation control means for controlling operation of the air pump;

a valve provided in the conduit;

valve operation control means for controlling operation of the valve to open/close the conduit;

air flow determining means for determining whether the air flows in the conduit, wherein said air flow determining means includes:
   current detecting means for detecting current supplied to an electric motor for driving the air pump;
   reference current determining means for determining a reference current of the motor which indicates a maximum current at no air flow; and
   comparing means for comparing the detected current with reference current;
   and said air flow determining means determines that the air flows in the conduit when the detected current is less than the reference current; and valve failure detecting means for detecting a failure occurring in the valve based on the determined air flow in the conduit when the air pump is controlled to operate while the valve is controlled to close the conduit.

2. A system for detecting a failure occurring in an exhaust secondary air supply system of an internal combustion engine, including a catalytic converter installed in an exhaust pipe of an exhaust system of the engine for reducing pollutants from exhaust gases emitted from the engine;

an oxygen sensor provided in the exhaust system;

air/fuel ratio detecting means for detecting an air/fuel ratio of exhaust gas based on an output of the oxygen sensor;

a conduit connected, at one end, to the exhaust pipe at a location upstream of the catalytic converter;

an air pump connected to an opposite end of the conduit for supplying air in the conduit; and a valve provided in the conduit;

wherein said system comprising:

failure detection condition checking means for checking whether a failure detection condition is met;

operation controlling means for controlling the valve to close the conduit and the air pump in operation;

time checking means for checking whether a predetermined time has passed since the air pump was in operation;

air/fuel ratio checking means for checking whether the detected air/fuel ratio is leaner than a desired air/fuel ratio when the predetermined time has passed; and valve failure detecting means for detecting the valve is stuck to open, when detected air/fuel ratio is leaner than the desired air/fuel ratio.

3. A system according to claim 2, wherein said operation controlling means restarts the air pump after the air pump was stopped.

4. A system according to claim 2, wherein said valve comprising:

an air switching valve provided in the conduit and having a diaphragm to form a chamber which is connected to an air intake pipe downstream of a throttle valve via a passage and a valve member rested on a seat;

a solenoid valve equipped at the passage which introduces negative pressure to the chamber via the passage when energized such that the valve member is lifted from the seat to open/close the conduit;

a reed valve made of an elastic plate whose end is cantilevered back at an edge of the seat in such a manner that an opposite free end bends to open the conduit when air is supplied from the air pump; and wherein said operation control means deenergizes the solenoid valve to close the conduit; and said valve failure detecting means detects that at least one of the air switching valve and the reed valve is stuck to open.

5. A system according to claim 4, wherein said operation controlling means deenergizes the solenoid valve and delays stopping of the air pump for a period at least longer than the predetermined time after deenergizing the solenoid valve.

6. A system for detecting a failure occurring in an exhaust secondary air supply system of an internal combustion engine, comprising:

a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit:

air pump operation control means for controlling operation of the air pump;

a valve provided in the conduit, the valve having a valve member resting on a valve seat and movable from the valve seat to open the conduit in response to negative pressure;

a negative pressure source for supplying the negative pressure;

connecting means for connecting the valve to the source;

a detector for generating a signal indicative of movement of the valve member;

valve failure detecting means for detecting a failure occurring in the valve based on the signal generated by said detector.

7. A system according to claim 6, wherein the failure is that the valve is stuck to close.

8. A method for detecting a failure occurring in an exhaust secondary air supply system of an internal combustion engine, having a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit;

air pump operation control means for controlling operation of the air pump;

a valve provided in the conduit;

valve operation control means for controlling operation of the valve to open/close the conduit;

current detecting means for detecting current supplied to an electric motor for driving the air pump;

reference current determining means for determining a reference current of the motor which indicates a maximum current at no air flow; and comparing means for comparing the detected current with the reference current;

wherein the method comprises the steps of:

determining whether the air flows in the conduit when the detected current is less than the reference current; and detecting a failure occurring in the valve based on the determined air flow in the conduit when the air pump is controlled to operate while the valve is controlled to close the conduit.

9. A method for detecting a failure occurring in an exhaust secondary air supply system of an internal combustion engine, having a catalytic converter installed in an exhaust pipe of an exhaust system of the engine for reducing pollutants from exhaust gases emitted from the engine;

an oxygen sensor provided in the exhaust system;

air/fuel ratio detecting means for detecting an air/fuel ratio of exhaust gas based on an output of the oxygen sensor;

a conduit connected, at one end, to the exhaust pipe at a location upstream of the catalytic converter;

an air pump connected to an opposite end of the conduit for supplying air in the conduit;

a valve provided in the conduit; and wherein the method comprises the steps of:

determining whether the air flows in the conduit;

checking whether a failure detection condition is met;

controlling the valve to close the conduit and the air pump in operation;

checking whether a predetermined time has passed since the air pump was in operation;

checking whether the detected air/fuel ratio is leaner than a desired air/fuel ratio when the predetermined time has passed; and detecting whether the valve is stuck open when the detected air/fuel ratio is leaner than the desired air/fuel ratio.

10. A method according to claim 9, further comprising the step of restarting the air pump after the air pump was stopped.

11. A method according to claim 9, further including:

an air switching valve provided in the conduit and having a diaphragm to form a chamber which is connected to an air intake pipe downstream of a throttle valve via a passage and a valve member rested on a seat;

a solenoid valve equipped at the passage which introduces negative pressure to the chamber via the passage when energized such that the valve member is lifted from the seat to open close the conduit;

a reed valve made of an elastic plate whose end is cantilevered back at an edge of the seat in such a manner that an opposite free end bends to open the conduit when air is supplied from the air pump; and further comprising the steps of deenergizing the solenoid valve to close the conduit; and detecting that at least one of the air switching valve and the reed valve is stuck to open.

12. A method according to claim 11, further comprising the step of deenergizing the solenoid valve and delaying stopping of the air pump for a period at least longer than the predetermined time after deenergizing the solenoid valve.

13. A method for detecting a failure occurring in an exhaust secondary air supply system of an internal combustion engine, having:

a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit;

air pump operation control means for controlling operation of the air pump;

a valve provided in the conduit, the valve having a valve member resting on a valve seat and movable from the valve seat to open the conduit in response to negative pressure;

a negative pressure source for supplying the negative pressure;

connecting means for connecting the valve to the source; and a detector for generating a signal indicative of movement of the valve member;

wherein the method comprises the step of:

detecting a failure occurring in the valve based on the signal generated by said detector.

14. A method according to claim 13, wherein the failure is that the valve is stuck to close.

15. A computer program for detecting a failure occurring in an exhaust secondary air supply system of an internal combustion engine, having a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit;

air pump operation control means for controlling operation of the air pump:

a valve provided in the conduit;

valve operation control means for controlling operation of the valve to open/close the conduit;

current detecting means for detecting current supplied to an electric motor for driving the air pump;

reference current determining means for determining a reference current of the motor which indicates a maximum current at no air flow; and comparing means for comparing the detected current with the reference current;

wherein the computer program comprises the steps of:

determining whether the air flows in the conduit when the detected current is less than the reference current; and detecting a failure occurring in the valve based on the determined air flow in the conduit when the air pump is controlled to operate while the valve is controlled to close the conduit.

16. A computer program for detecting a failure occurring in an exhaust secondary air supply system of an internal combustion engine, having a catalytic converter installed in an exhaust pipe of an exhaust system of the engine for reducing pollutants from exhaust gases emitted from the engine;

an oxygen sensor provided in the exhaust system;

air/fuel ratio detecting means for detecting an air/fuel ratio of exhaust gas based on an output of the oxygen sensor;

a conduit connected, at one end, to the exhaust pipe at a location upstream of the catalytic converter;

an air pump connected to an opposite end of the conduit for supplying air in the conduit;

a valve provided in the conduit; and wherein the computer program comprises the steps of:

determining whether the air flows in the conduit;

checking whether a failure detection condition is met;

controlling the valve to close the conduit and the air pump in operation:

checking whether a predetermined time has passed since the air pump was in operation;

checking whether the detected air/fuel ratio is leaner than a desired air/fuel ratio when the predetermined time has passed; and detecting whether the valve is stuck open when the detected air/fuel ratio is leaner than the desired air/fuel ratio.

17. A computer program according to claim 16, further comprising the step of restarting the air pump after the air pump was stopped.

18. A computer program according to claim 16, further including:

an air switching valve provided in the conduit and having a diaphragm to form a chamber which is connected to an air intake pipe downstream of a throttle valve via a passage and a valve member rested on a seat;

a solenoid valve equipped at the passage which introduces negative pressure to the chamber via the passage when energized such that the valve member is lifted from the seat to open/close the conduit;

a reed valve made of an elastic plate whose end is cantilevered back at an edge of the seat in such a manner that an opposite free end bends to open the conduit when air is supplied from the air pump; and further comprising the steps of deenergizing the solenoid valve to close the conduit; and detecting that at least one of the air switching valve and the reed valve is stuck to open.

19. A computer program according to claim 18, further comprising the step of deenergizing the solenoid valve and delaying stopping of the air pump for a period at least longer than the predetermined time after deenergizing the solenoid valve.

20. A computer program for detecting a failure occurring in an exhaust secondary air supply system of an internal combustion engine, having:

a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit;

air pump operation control means for controlling operation of the air pump;

a valve provided in the conduit, the valve having a valve member resting on a valve seat and movable from the valve seat to operate the conduit in response to negative pressure;

a negative pressure source for supplying the negative pressure;

connecting means for connecting the valve to the source; and a detector for generating a signal indicative of movement of the valve member;

wherein the computer program comprises the step of:
  detecting a failure occurring in the valve based on the signal generated by said detector.

21. A computer program according to claim 20, wherein the failure is that the valve is stuck to close.

* * * * *